R. I. KLINE.
ARTIFICIAL STONE MAKING.
APPLICATION FILED MAR. 8, 1920.

1,344,087.

Patented June 22, 1920.

Inventor
Robert I. Kline

By Hood & Pithy
Attorneys

UNITED STATES PATENT OFFICE.

ROBERT I. KLINE, OF INDIANAPOLIS, INDIANA.

ARTIFICIAL-STONE MAKING.

1,344,087.

Specification of Letters Patent.

Patented June 22, 1920.

Application filed March 8, 1920. Serial No. 364,238.

*To all whom it may concern:*

Be it known that I, ROBERT I. KLINE, a citizen of the United States, residing at Indianapolis, in the county of Marion and State of Indiana, have invented a new and useful Artificial-Stone Making, of which the following is a specification.

It is the object of my invention to improve and simplify the making of artificial stone blocks having veneered faces; and particularly to make the removal of the stone from the mold easier and to prevent the likelihood of breaking off the corners of the stone in such removal and in the scrubbing and polishing to which the veneered face of the stone is subjected in order to remove the cement film and expose the fragments of natural stone which form the basis of the veneering and polish the veneered face.

Figure 1:
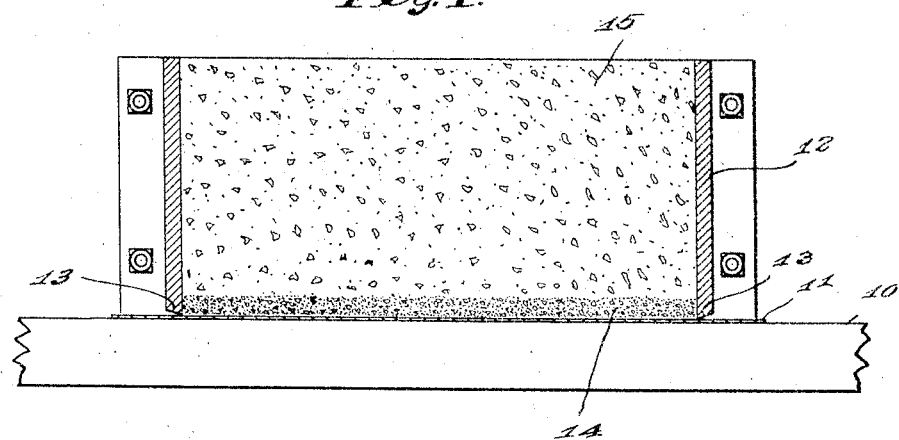
Figure 2:
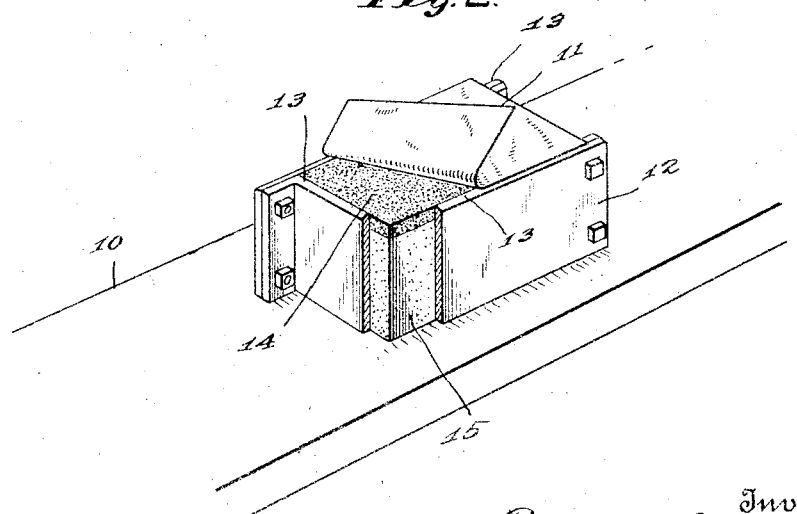

The accompanying drawing illustrates my invention; Figure 1 is a transverse vertical section through a mold embodying my invention, with the concrete of the veneering and of the body of the stone in place; and Fig. 2 is a perspective view of such mold inverted, with part of the mold broken away and with the facing sheet partly removed.

On the face plate 10 having a flat upper face is placed a facing sheet 11, of somewhat greater dimensions than the face of the block is to be. This facing sheet 11 may be of paraffined paper or of some smooth sheet metal, such as thin sheet brass. The mold 12 is placed on the facing sheet 11, which because of its size projects outward beneath the lower edges of the mold. The mold is of suitable size and shape to produce the desired block, which may be a building block or any other artificial stone block. The lower edges 13 of the mold 12 are beveled, with an acute angle between such beveled edges and the inner face of the mold, so that the edges of the mold engage the facing sheet 11 only at and near the inner faces of the mold. With this beveled-edge construction, a tight joint is produced between the mold and the facing sheet—which is not the case if the edges 13 are not beveled.

When the mold is in place on the facing sheet, the material for the veneering is put into the mold on top of the facing sheet, to form the veneering 14 of the desired thickness; and then the concrete 15 which is to form the body of the stone is put into the mold on top of the veneering 14. The body 15 of the stone is usually of comparatively dry concrete, for convenience in manufacture; but in order to get a dense and hard veneering it is made of a comparatively wet mixture of cement and an aggregate of the desired broken stone which the face of the block is to show, such as marble or granite. This wet mixture, it is found, will be retained in the mold, because of the character of the joint between the facing sheet 11 and the beveled edges 13. After the material of the stone has sufficiently hardened, the mold with such material in it is inverted from the position shown in Fig. 1 to the position shown in Fig. 2 to place the veneered face upward. During such inversion the facing sheet 11 is retained in place; but after the veneered face is uppermost the facing sheet 11 is peeled off, as indicated in Fig. 2. This is done while the stone is still in the mold 12, so that the sides of the mold protect the corners of the stone at the face and prevent such corners from being broken off by the removal of the facing sheet. This protection of the corners is very important in order to get a perfect stone. After the facing sheet has been removed, and while the stone is still in the mold 12, the veneered face is scrubbed with rather a stiff scrubbing brush in order to remove from such veneered face the thin film of cement which formed between the fragments of stone of the veneering and the facing sheet, or is otherwise polished. During this scrubbing and polishing operation, as during the removal of the facing sheet, the mold 12 which surrounds the stone effectively prevents the corners from being broken off, as would otherwise occur on account of the scrubbing brush or other polishing device striking such corners. After the film has been removed by this scrubbing operation, to expose the fragments of marble, granite, or other stone forming the face of the veneering and the stone has become sufficiently hard, and the face is further polished if desired, the mold 12 is removed, and the stone is complete.

I claim as my invention:

1. In a molding device for making artificial stone, the combination of a face plate, a mold coöperating with said face plate and having beveled edges with the acute angles toward the inner faces of the mold, and a flexible facing sheet of paraffined paper of greater length and breadth than the mold and arranged to be located between the mold and the face plate with the beveled edges of the mold resting upon it, so that when the stone has been molded in the mold the facing sheet may be peeled off while the stone is still in the mold.

2. In a molding device for making artificial stone, the combination of a face plate, a mold coöperating with said face plate and having beveled edges with the acute angles toward the inner faces of the mold, and a flexible facing sheet of greater length and breadth than the mold and arranged to be located between the mold and the face plate with the beveled edges of the mold resting upon it, so that when the stone has been molded in the mold the facing sheet may be peeled off while the stone is still in the mold.

3. The process of making artificial stone, which comprises placing a mold having beveled edges upon a flexible facing sheet resting upon a face plate with the beveled edges of the mold in engagement with such facing sheet, filling the mold with the desired concrete, removing the face plate, and peeling off the flexible facing sheet from the stone while the latter is still in place in the mold.

4. The process of making artificial stone, which comprises placing a mold having beveled edges upon a flexible facing sheet resting upon a face plate with the beveled edges of the mold in engagement with such facing sheet, filling the mold with the desired concrete, removing the face plate, peeling off the flexible facing sheet from the stone while the latter is still in place in the mold, and while the stone is still in the mold working on the face exposed by the peeling off of such facing sheet in order to remove the film of cement and expose and polish the aggregate.

ROBERT I. KLINE.